US008484132B1

(12) United States Patent
Christiansen et al.

(10) Patent No.: US 8,484,132 B1
(45) Date of Patent: Jul. 9, 2013

(54) SYSTEMS AND METHODS FOR SEGMENTED RISK SCORING OF IDENTITY FRAUD

(75) Inventors: James Alan Christiansen, Chanhassen, MN (US); Fang Yuan, Eden Prairie, MN (US); Michael James Woodberry, Bozeman, MN (US); Brent Wayne Sorenson, Prior Lake, MN (US); Jeffrey Allen Feinstein, Roswell, GA (US)

(73) Assignee: LexisNexis Risk Solutions FL Inc., Boca Raton, FL (US)

( * ) Notice: Subject to any disclaimer, the term of this patent is extended or adjusted under 35 U.S.C. 154(b) by 0 days.

(21) Appl. No.: 13/491,786

(22) Filed: Jun. 8, 2012

(51) Int. Cl.
   *G06Q 40/00* (2012.01)
(52) U.S. Cl.
   USPC .............................................. 705/44; 705/35
(58) Field of Classification Search
   USPC ........................................ 705/44, 35
   See application file for complete search history.

(56) References Cited

U.S. PATENT DOCUMENTS

| 7,458,508 B1 | 12/2008 | Shao et al. | |
| 2006/0149674 A1* | 7/2006 | Cook et al. | 705/44 |

OTHER PUBLICATIONS

Business_Wire, "CEO Venture Fund Leads Leads Financing of Advanced Software Applications"; Jan. 9, 1998, Supplier No. 20125451.*
Ferretti, Federico F, "Re-thinking the regulatory environment of credit reporting"; 2006, Journal of Financial Regulation & Compliance; ISSN: 1358-1988.*
American_Banker; "High-tech weapons to combat fraud"; Apr. 23, 1996; ISSN: 0002-7561.*

* cited by examiner

*Primary Examiner* — Edward Chang
(74) *Attorney, Agent, or Firm* — Mark Lehi Jones; Ryan A. Schneider, Esq.; Troutman Sanders LLP

(57) ABSTRACT

Certain embodiments of the invention may include systems, methods, and apparatus for determining fraud risk associated with a credit application. According to an exemplary embodiment of the invention, a method is provided for receiving applicant information associated with the application; searching one or more consumer identity repositories for prior usage of the applicant information; generating a plurality of identity characteristics corresponding to the prior usage of the applicant information; assigning the application to one of a plurality of segments based at least in part on the searching; scoring the application with a predictive scoring model to determine a risk score based at least in part on the identity characteristics; determining identity fraud risk types associated with the application; and outputting the risk score and one or more indicators of the determined identity fraud risk types.

20 Claims, 5 Drawing Sheets

SYSTEMS AND METHODS FOR SEGMENTED RISK SCORING OF IDENTITY FRAUD

FIELD OF THE INVENTION

This invention generally relates to credit applications, and in particular, to determining and scoring identity fraud risk.

BACKGROUND OF THE INVENTION

Credit card lenders are faced with the problem of fraudulent credit applications and associated revenue loss when credit is obtained with a misrepresented identity. Identity fraud continues to present difficult challenges for today's financial institutions, as many lenders unknowingly open credit accounts based on applications having synthetic, stolen or manipulated identity information. Although such fraud incidents are rare, they can be very costly. Technically well-informed fraud perpetrators with sophisticated deception schemes are likely to continue targeting financial institutions, particularly if fraud detection and prevention mechanisms are not in place. Balancing the threats of identity fraud with efficient service for legitimate clients creates a significant challenge for lenders.

BRIEF SUMMARY OF THE INVENTION

Some or all of the above needs may be addressed by certain embodiments of the invention. Certain embodiments of the invention may include a method that executes computer executable instructions by one or more processors for determining risk associated with a credit application. Exemplary embodiments of the method can include receiving applicant information associated with the application; searching one or more consumer identity repositories for prior usage of the applicant information; generating a plurality of identity characteristics corresponding to the prior usage of the applicant information; assigning the application to one of a plurality of segments based at least in part on the searching; scoring the application with a predictive scoring model to determine a risk score based at least in part on the identity characteristics, wherein the risk score provides an indication of a fraudulent application; determining identity fraud risk types associated with the application based at least in part on the identity characteristics; and outputting the risk score and one or more indicators of the determined identity fraud risk types.

According to another exemplary embodiment, a system is provided. The system can include at least one memory for storing data and computer-executable instructions; and at least one processor configured to access the at least one memory and further configured to execute the computer-executable instructions to receive applicant information associated with a credit application; search one or more consumer identity data repositories for prior usage of the applicant information; generate a plurality of identity characteristics corresponding to the prior usage of the applicant information; assign the application to one of a plurality of segments based at least in part on the search; score the application with a predictive scoring model to determine a risk score based at least in part on the identity characteristics, wherein the risk score provides an indication of a fraudulent application; determine identity fraud risk types associated with the application based at least in part on the identity characteristics; and output the risk score and one or more indicators of the determined identity fraud risk types.

According to another exemplary embodiment, computer readable media is provided. The computer readable media may include computer-executable instructions that, when executed by one or more processors, configure the one or more processors to receive applicant information associated with a credit application; search one or more identity data repositories for prior usage of the applicant information; generate a plurality of identity characteristics corresponding to the prior usage of the applicant information; assign the application to one of a plurality of segments based at least in part on the search; score the application with a predictive scoring model to determine a risk score based at least in part on the identity characteristics, wherein the risk score provides an indication of a fraudulent application; determine identity fraud risk types associated with the application based at least in part on the identity characteristics; and output risk score and one or more indicators of the determined identity fraud risk types.

Other embodiments, features, and aspects of the invention are described in detail herein and are considered a part of the claimed inventions. Other embodiments, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION OF THE INVENTION

Figure 1:
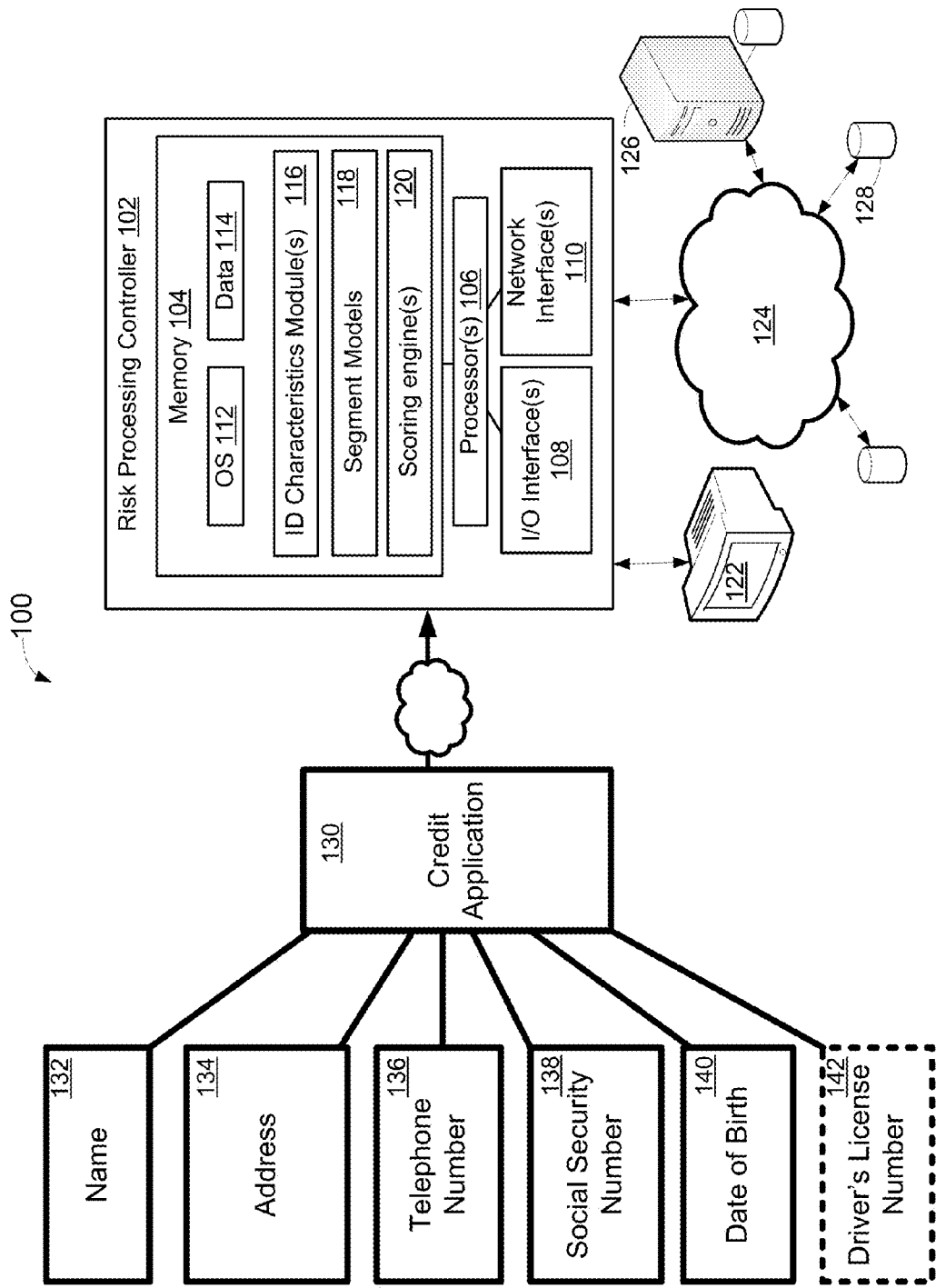
FIG. 1 is a block diagram of an illustrative credit application risk scoring system 100 according to an exemplary embodiment of the invention.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the following description, numerous specific details are set forth. However, it is to be understood that embodiments of the invention may be practiced without these specific details. In other instances, well-known methods, structures and techniques have not been shown in detail in order not to obscure an understanding of this description. The term "exemplary" herein is used synonymous with the term "example" and is not meant to indicate excellent or best. References to "one embodiment," "an embodiment," "exemplary embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Certain exemplary embodiments of the invention may enable effective management of new account fraud risk and may reduce fraud losses associated with credit applications. Certain exemplary embodiments may identify specific types of possible identity fraud and risk levels associated with a credit application. For example, personal information submitted with a credit application may be analyzed with respect to available information in public and/or non-public records to determine the authenticity of the applicant data. According to exemplary embodiments, the analysis may involve comparisons on multiple levels using models specific to the type of risk identified. According to exemplary embodiments, the analysis may further identify discrepancies (if any), categorize the type of possible fraud, score the risk of fraud, and/or further evaluate the credit application information based on the type of risk.

According to certain exemplary embodiments, applicant information may be processed, compared with various public and non-public information sources, and analyzed to avoid rejecting a legitimate applicant who may normally be rejected based on a less comprehensive analysis. Exemplary embodiments of the invention may utilize pattern recognition to improve legacy fraud prevention strategies. Certain exemplary embodiments may reduce fraud losses, reduce false positives and improve operational efficiency.

According to an exemplary embodiment, a plurality of predetermined segments may be utilized to group credit card applications for evaluating each application's risk for identity fraud, and to classify each application on a plurality of dimensions corresponding to different kinds of identity fraud. The segments, for example, may be based on whether the identity has previously been reported; whether the address on the application matches an address previously reported; whether the social security number on the application has been previously reported with a different identity; whether the identity has only been reported by credit bureau sources; whether the identity has been the subject of recent account opening inquiries; or whether the identity has a history of derogatory or high risk events. According to an exemplary embodiment, other additional segments may be utilized without departing from the scope of the invention. In an exemplary embodiment, an additional segment may be utilized for credit card applications that do not match with any of the other predetermined segments.

According to an exemplary embodiment, a score may be generated for each application based on a unique scorecard model designed for each segment. For example, the unique scorecard models may provide more accurate fraud detection by evaluating each application in view of that risk type or segment's tendency to be fraudulent. According to an exemplary embodiment, credit application data and information associated with source records may be aggregated and intelligently examined for indications of fraud. Source records may include, but are not limited to property deeds, credit bureau identity files, utility connects and disconnects, driver licenses, voter registrations, and/or college directories. Exemplary embodiments of the invention may aggregate and process such information to locate inconsistencies and/or patterns that may further identify certain types of fraud associated with the credit application.

In an exemplary embodiment, a risk score, a risk type, and/or warning codes may be generated for each processed credit application. For example, the risk score may indicate a likelihood that an application will result in fraud if the account is opened. In one exemplary but non-limiting embodiment, the generated risk score may be a three digit numeric score ranging from 300-999. In one exemplary embodiment, a risk score of 999 may indicate the lowest likelihood of fraud and 300 may represent the highest likelihood of fraud. In other exemplary embodiments, the generated risk score may be normalized or transformed to span any convenient range.

According to an exemplary embodiment, a risk type may be generated and provided for each processed credit application. For example, the risk index may indicate the type of fraud detected. Identity fraud in credit applications can be categorized into several distinct types, for example:

(1) Stolen Identity: using someone else's identity to obtain credit or services;

(2) Synthetic Identity: fabricating a fictitious identity in order to avoid responsibility for credit repayment;

(3) Manipulated Identity: intentionally manipulating the record of one's real identity by using multiple social security numbers, address variations or name spellings;

(4) Friendly Fraud: using a family member or roommate's identity in order to obtain goods or services;

(5) High Risk Identity: individuals who have elevated risk of perpetrating fraud, for example, those with a record of broken contracts, felony convictions or lawlessness; and (6) Vulnerable Victim: individuals with elevated risk of being the victim of fraud, for example, an underage minor or an elderly retiree.

According to exemplary embodiments, a risk index may be generated for each of the above risk types in each processed application. For example, the risk index may indicate the likelihood that the corresponding risk type is associated with the application. These unique risk indicators may allow fraud prevention teams to improve operational efficiency by bypassing much of the research needed to determine the type of identity fraud being attempted. Exemplary embodiments may allow investigators and analysts to appropriately direct cases to the specialists that are best equipped to mitigate the suspected fraud activity or to execute actions that related to the risk condition. According to other exemplary embodiments, the risk index may be utilized top automatically generate a list of additional identity proof requirements needed from the applicant before a credit application is allowed or further processed.

Example Process

According to an exemplary embodiment, each application may be assigned to the first of the plurality of segments for which the application information matches that segment criteria. According to exemplary embodiment, segment 1 may be defined as those applications that include a social security number (SSN) that has either been reported as deceased or an SSN that was issued prior to the declared date-of-birth on the application. Segment 2 may be defined as those applications that include a known subject identity based on a search of identity sources, but where the address presented has not previously been reported as a residential address for the subject. Segment 3 may be defined as those applications having identities that have not previously been reported by any identity source. Segment 4 may be defined as those applications having identities that have only been reported by credit bureau sources. Segment 5 may be defined as those applications having identities that have been reported by derogatory or law enforcement sources. Segment 6 may be defined as those applications having identities that have elevated recent account opening activity as seen in inquiry searches. Segment 7 may be defined as those applications having identities that do not fall into any of Segments 1 to 6.

According to exemplary embodiments, a custom fraud scoring model may be used for each segment, based on an empirical analysis of known frauds and non-frauds in a training dataset. Each custom scorecard model may be optimized based on the specific characteristics present in each segment, and designed to differentiate normal, low risk applications from high fraud risk applicants.

According to exemplary embodiments, the combination of segment designation and the value of each segment's generated fraud score may then be combined in a series of algorithms to determine the risk types (Synthetic Identity Index, Stolen Identity Index, Manipulated Identity Index, Vulnerable Victim Index, Friendly Fraud Index and High Risk Identity Index). Exemplary embodiments may provide index scores for these risk types as a quantified estimate that the scored application is likely one or more of these types of fraud.

Table 1 lists example dimensions in which information submitted on a credit application may be evaluated and categorized for determining identity characteristics. According to exemplary embodiments, such identity characteristics may be utilized to determine segments, categorize risk types, generate identity fraud risk types, and/or generate risk scores.

TABLE 1

| Reason Code | Code Description | Additional Information |
|---|---|---|
| 2 | The input SSN is reported as deceased | The input Social Security Number (SSN) reported as deceased by the Social Security Administration or various state death records. Any transaction with the input SSN reported as deceased may return an exception score, and a reason code of 02 may be returned as one of the reason codes. |
| 3 | The input SSN was issued prior to the input Date of Birth | The input SSN high issue date is before the input date of birth. |
| 4 | The input Last Name and SSN are verified, but not with the input Address and Phone | The input SSN is associated with the input last name, the input phone is associated with the input address, but there is no association of the input name to the input address. |
| 6 | The input SSN is invalid | The input SSN has not been issued according to the Social Security Administration. |
| 7 | The input phone number may be disconnected | The input phone number was listed to the input address but is reported as being disconnected. |
| 8 | The input phone number is potentially invalid | Area code and phone exchange combination is invalid in the U.S. |
| 9 | The input phone number is a pager number | The input phone number is only provided pager service. |
| 10 | The input phone number is a mobile number | The input phone number is not a landline |
| 11 | The input address may be invalid according to postal specifications | The input address was not verified and is not deliverable per the United States Postal Service. |
| 12 | The input zip code belongs to a post office box | The input zip code is a non-residential zip code for PO Box usage only. |
| 13 | The input address has an invalid apartment designation | The input address unit designation is not valid for that street address. |
| 14 | The input address is a transient or institutional address | The input address is associated with a non-residential institution such as a hotel, campground, warehouse, mail drop, transient business, or correctional facility. |
| 15 | The input phone number matches a transient or institutional address | The input phone number is listed to a non-residential institution such as a hotel, campground, warehouse, mail drop, transient business, or correctional facility. |
| 16 | The input phone number and input zip code combination is invalid | The input phone number is associated with a different geographical location than the input address. |
| 19 | Unable to verify name, address, SSN/TIN and phone | No more than one of the input identity elements are verified (Name, Address, SSN, and Phone) |
| 20 | Unable to verify applicant name, address and phone number | Verification failure of Name, Address, and Phone |
| 22 | Unable to verify applicant name and address | Verification failure of Name and Address |
| 23 | Unable to verify applicant name and SSN | Verification failure of Name and SSN |
| 24 | Unable to verify applicant address and SSN | Verification failure of Address and SSN |
| 25 | Unable to verify applicant address | Verification failure of input Address |
| 26 | Unable to verify SSN / TIN | Verification failure of input SSN |

TABLE 1-continued

| Reason Code | Code Description | Additional Information |
|---|---|---|
| 27 | Unable to verify applicant phone number | Verification failure of input phone being associated with the input address |
| 28 | Unable to verify applicant date-of-birth | Verification failure of input date-of-birth |
| 29 | The input SSN/TIN may have been miskeyed | Close matching SSN was found (1 digit off or 2 digits transposed) |
| 30 | The input address may have been miskeyed | Close matching address found |
| 31 | The input phone number may have been miskeyed | Close matching phone found |
| 35 | Insufficient verification to return a score under CA law | Per CA Statute 1785.14 (a) (1), if a credit grantor is a retail seller and intends to issue credit to a consumer who appears in person on the basis of an application for credit submitted in person, the CRA shall match at least three categories of identifying information within the file maintained by the CRA on the consumer with the information provided to the CRA by the retail seller. This would be any combination of any of the following elements: first name, last name, current address, phone number, social security number and or month and year of birth. Any transactions subject to insufficient inquiry data may return an exception score, and a reason code of 35 may be returned. |
| 36 | Identity elements not fully verified on all available sources | The input identity elements were not verified on all available sources. |
| 37 | Unable to verify applicant name | Verification failure of input last name |
| 41 | The input driver's license number is invalid for the input DL state | The driver's license number is not a valid format for the designated state |
| 45 | The input SSN and address are not associated with the input last name and phone | SSN is associated with a different name at that address, name is verified from phone information |
| 48 | Unable to verify first name | Verification failure of input first name |
| 49 | The input phone and address are geographically distant (>10 miles) | The input phone is listed to an address more than 10 miles away |
| 50 | The input address matches a prison address | The input address matches a correctional facility address |
| 51 | The input last name is not associated with the input SSN | The input SSN is associated with a different last name |
| 52 | The input first name is not associated with input SSN | The input SSN is associated with a different first name |
| 71 | The input SSN is not found in the public record | The input SSN cannot be found on any available source |
| 72 | The input SSN is associated with a different name and address | The input SSN is associated with a different subject at a different address |
| 73 | The input phone number is not found in the public record | The input phone cannot be found on any available source |
| 74 | The input phone number is associated with a different name and address | The input phone is listed to a different consumer at a different address than the input address |
| 77 | The input name was missing | The input name was missing |
| 78 | The input address was missing | The input address was missing |
| 79 | The input SSN/TIN was missing or incomplete | The input SSN was missing or incomplete |
| 80 | The input phone was missing or incomplete | The input phone was missing or incomplete |
| 81 | The input date-of-birth was missing or incomplete | The input date-of-birth was missing or incomplete |
| 82 | The input name and address return a different phone number | Input phone is different than phone in service at address return a different input address |
| 83 | The input date-of-birth may have been miskeyed | Close matching date of birth found |

TABLE 1-continued

| Reason Code | Code Description | Additional Information |
|---|---|---|
| 91 | Security Freeze (CRA corrections database) | Applicant has placed a security freeze on their consumer file to prevent their data from being delivered in the event it is requested from a credit grantor. Any transactions subject to a security freeze can return an exception score, and a reason code of 91 as one of the reason codes. |
| 92 | Security Alert (CRA corrections database) | Applicant has requested a security alert be placed on their consumer file notifying any potential credit grantor of a possible identity theft. Any transactions subject to a security alert can return an exception score and a reason code of 92 as one of the reason codes. |
| 93 | Identity Theft Alert (CRA corrections database) | Applicant has requested an identity theft alert be placed on their consumer file notifying any potential credit grantor of a possible identity theft event. Any transactions subject to an identity theft alert can return an exception score and a reason code of 93 as one the reason codes. |
| 94 | Dispute On File (CRA corrections database) | Applicant has disputed the accuracy of some of the information maintained by LexisNexis Risk Solutions Bureau LLC (LexisNexis). LexisNexis was unable to verify the dispute was valid and, therefore, did not make any changes to the content. The consumer has requested a statement be placed on their file disputing the accuracy of the information. Any transactions associated with a consumer who has placed such a statement on file can return a score and the reason code of 94 may be returned as one of the reason codes to prevent the use of or return of information referenced by the consumer's statement. |
| 95 | Subject has opted out of prescreen offers | A consumer may choose to be removed from prescreen offers and add themselves to the prescreen opt-out list. In prescreen scenarios (when the FCRA purpose selected is prescreening), if the consumer is listed on the opt-out list, an exception score and a reason code of 95 may be returned as one the reason codes. |
| 97 | Criminal record found | Criminal conviction history found |
| 98 | Lien/Judgment record found | Public record of a lien or judgment filed |
| 99 | The input address is verified but may not be primary residence | Input address is associated with subject, but may not be their primary residence |
| 9A | No evidence of property ownership | No evidence of current or historical property ownership |
| 9B | Evidence of historical property ownership but no current record | No evidence of current property ownership, but evidence of historical ownership |
| 9C | Length of residence | Time at current address is short |
| 9D | Change of address frequency | Too many address changes on file |
| 9E | Number of sources confirming identity and current address | Too few sources in public record consumer file documenting current address |
| 9F | Date of confirming source update | No recorded updates within the past 24 months |
| 9G | Insufficient Age | Applicant lost points because age was <23 years |
| 9H | Evidence of sub-prime credit services solicited | Applicant has solicited offers for sub-prime credit services |
| 9I | No evidence of post-secondary education | No record of education beyond high school for applicant |
| 9J | Age of oldest public record on file | Time since first seen in public records is <14 months |
| 9K | Address dwelling type | Applicant's dwelling type is not a single family dwelling unit |
| 9L | Distance between the current and previous address | The distance between the current and previous address is too far |
| 9M | Insufficient evidence of wealth | Lack of evidence of wealth on file for applicant |
| 9N | Correctional address in address history | The applicant has an address associated with a correctional facility in their address history |
| 9O | No evidence of phone service at address | No evidence of phone service at the applicant's address |
| 9P | Number of consumer finance inquiries | Number of consumer finance inquiries |

TABLE 1-continued

| Reason Code | Code Description | Additional Information |
|---|---|---|
| 9Q | Number of inquiries in the last 12 months | Number of inquiries in the last 12 months |
| 9R | Length of time on sources confirming identity | Length of time on the sources confirming identity is too short |
| 9S | Type of mortgage | Applicant has an adjustable rate mortgage listed on public records |
| 9T | Input phone is invalid, non-residential or disconnected | Input phone is invalid, non-residential or disconnected |
| 9U | Input address invalid, non-residential or ndeliverable | Input address invalid, non-residential or |
| 9V | Input SSN is invalid, recently issued, or inconsistent with date of birth | Input SSN is invalid, recently issued, or inconsistent with date of birth |
| 9W | Bankruptcy record on file | Bankruptcy record on file |
| 9X | Insufficient information on file | Insufficient data available on file to generate a score. Any transaction subject to insufficient data available on file to generate a score may return an exception score, and a reason code of 9X may be returned. |
| EV | Eviction record found | Unlawful detainer/eviction judgment filed against the consumer |
| MI | Multiple identities associated with input SSN | Input SSN is associated with multiple different individuals |
| MN | The input SSN was issued within the last seventeen years | SSN issued within past 17 years |
| MS | Multiple SSNs reported with applicant | Consumer is associated with multiple SSNs from multiple records |
| PV | Insufficient Property Value | Estimated current market value of applicant's real property is too low |

Various systems and methods may be utilized for determining risk associated with a credit application, according to exemplary embodiments of the invention, and will now be described with reference to the accompanying figures.

FIG. 1 illustrates a credit application risk scoring system 100 according to an exemplary embodiment of the invention. In this embodiment, the credit application 130 may include, but is not limited to applicant's name 132, address 134, telephone number 136, social security number 138, and date of birth 140. In certain exemplary embodiments, the applicant's driver's license number 142 may be included. Other information such as mother's maiden name, and previous addresses, may also be utilized in the credit application 130, according to exemplary embodiments of the invention.

According to an exemplary embodiment of the invention, the risk scoring system 100 may include a risk processing controller 102 to process the information associated with the credit application 130. According to exemplary embodiments, information may be extracted from the credit application 130 and sent to the risk processing controller 102. The risk processing controller 102 may include a memory 104 and one or more processors 106. The risk processing controller 102 may also include one or more input/output interfaces 108 and/or or more network interfaces 110 for communication, for example, with a local database, a local computer 122, and/or a remote server 126 and a remote database 128 through a network cloud system 124 or other network communication systems known to those skilled in the art.

In certain exemplary embodiments, the memory 102 associated with the risk processing controller 102 may include an operating system 112 and data 114. According to certain embodiments, the memory 104 may be configured to load certain processing modules for analyzing and processing the data from the credit application 130. For example, the memory 104 may include one or more identification characteristics modules 116, one or more segment models 118, and/or one or more scoring engines 120. According to an exemplary embodiment, the scoring engines 120 may utilize the segment models 118 and/or the identification characteristics modules 116 in processing the application information. According to exemplary embodiments, the example dimensions, as shown above in Table 1, may be utilized in conjunction with the identification characteristics modules 116 to evaluate and/or categorize application information for determining identity characteristics. According to exemplary embodiments, such identity characteristics may be utilized to determine segments, categorize risk types, generate identity fraud risk types, and/or generate risk scores.

Figure 2:
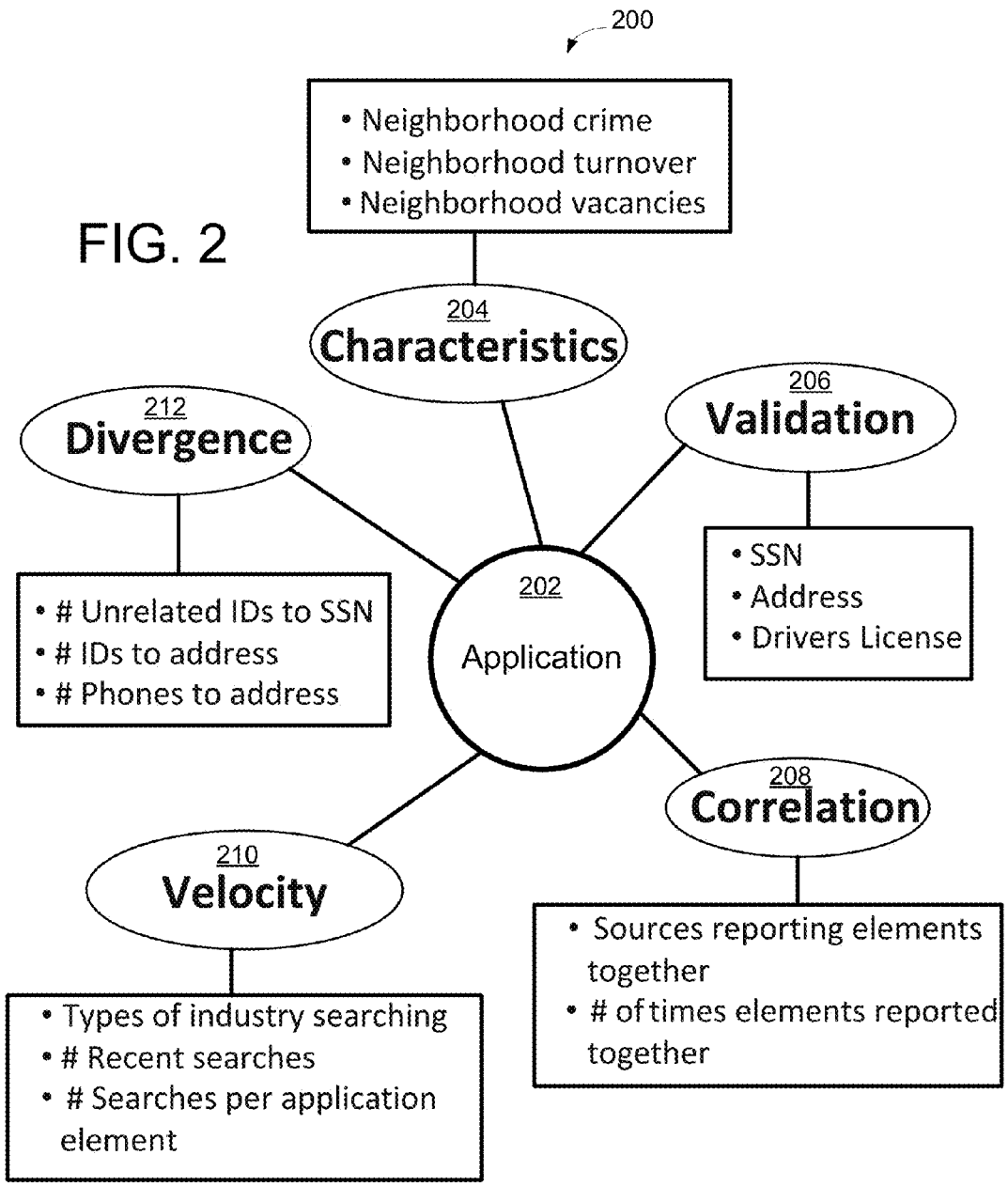
FIG. 2 illustrates certain identity bureau credit application information 200, according to an exemplary embodiment of the invention.

FIG. 2 depicts identity bureau credit application information 200 that can be tracked, stored, and utilized in a credit application risk determination process, according to an exemplary embodiment of the invention. According to an exemplary embodiment, classifications of information associated with an application 202 can include, but is not limited to characteristics 204, validation 206, correlation 208, velocity 210, and divergence 212. In an exemplary embodiment, the applicant information may be reviewed for characteristics 204 that may be useful in determining a credit risk. For example, based on the address of the applicant, localized information such as neighborhood crime, turnover rate, vacancies, etc., may be utilized for part of the risk evaluation and processing. According to an exemplary embodiment, validation 206 of the application information may be carried out by comparing the applicant-supplied information with the information available on certain public and/or non-public databases. In an exemplary embodiment, a social security number, address, and/or driver's license number may be cross-checked with the available bureau information to verify the applicant's supplied information.

According to another exemplary embodiment, information correlation 208 may be utilized in conjunction with the risk evaluation. For example, certain sources may report multiple data elements, with certain elements being reported together. For example, a first credit bureau may report the applicant's name and telephone number, while a second credit bureau may report the applicant's name, but with a different telephone number. If a third credit bureau reports the applicant's name and the same telephone number as reported by the first or second credit bureau, then such information may be useful in verifying the application data supplied by the applicant.

According to another exemplary embodiment, information velocity 208 may be utilized in conjunction with the risk evaluation. For example, an applicant may attempt to obtain credit from multiple sources over a short period of time, which may indicate fraud. On the other hand, such attempts to obtain credit from multiple sources may be due to an applicant seeking additional credit for financing valid activities, for example, such as remodeling a home. Tracking and analyzing industry types associated with the velocity 208 may be useful for determining fraud risk. According to an exemplary embodiment, the types of industry searching, the recent number of searches, and/or the number of searches per application element are examples of the types of information that may be analyzed for determining velocity 210.

According to another exemplary embodiment, information divergence 212 may be utilized in conjunction with the risk evaluation. For example, information from one data source that is not consistent, or that does not match with similar information from other data sources may be indicative of identity fraud. In one exemplary embodiment, a person's name and social security number supplied on the application may be checked against reported records with the same name or social security to see if there are discrepancies. A similar process can be carried out using the applicant's name and address, or address and phone number, etc. According to exemplary embodiments, the number of discrepancies in this process may provide information for evaluating risk according to the divergence 212 classification.

Figure 3:
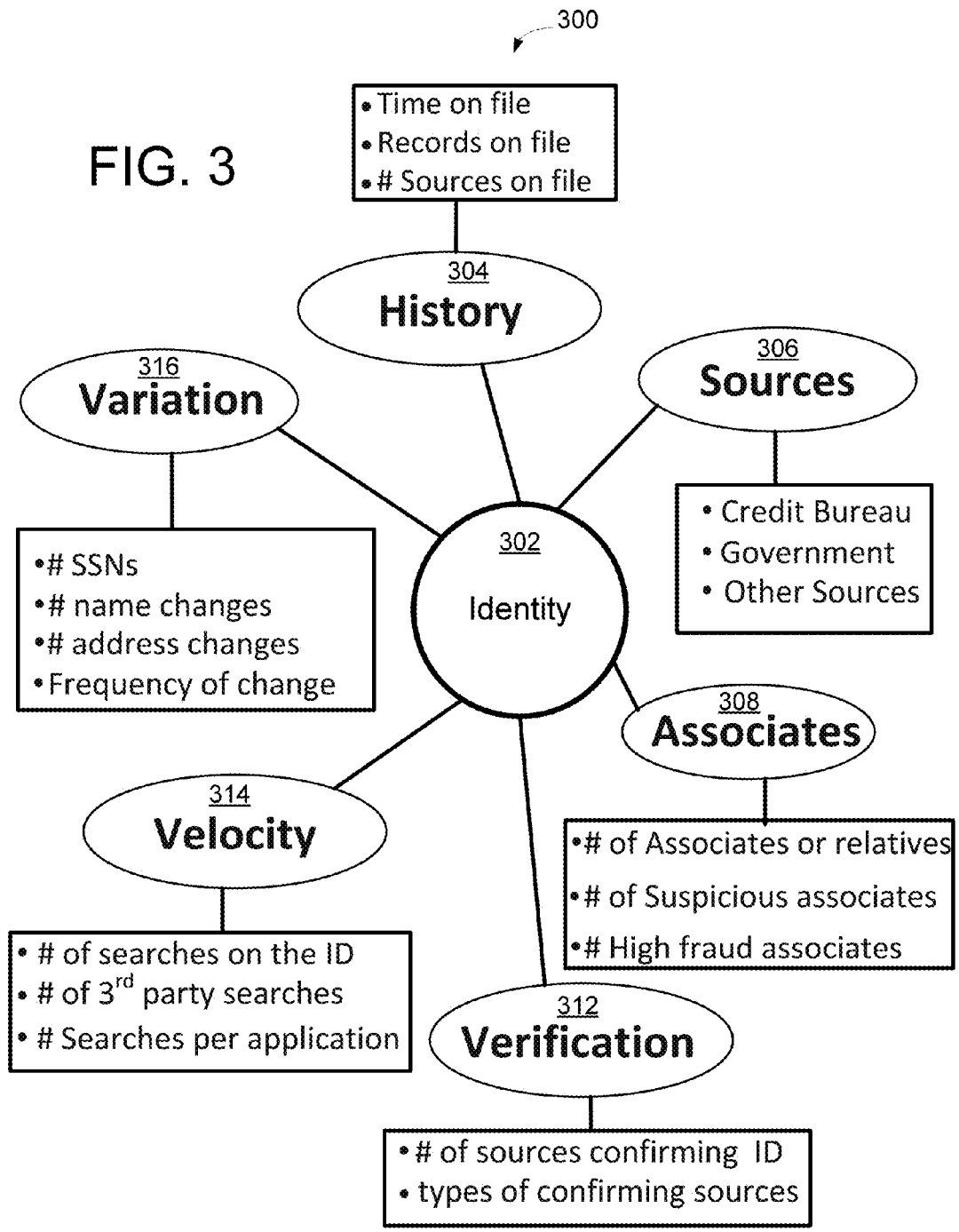
FIG. 3 illustrates additional identity bureau credit application information 300, according to an exemplary embodiment of the invention.

FIG. 3 depicts exemplary embodiment of an additional identity bureau credit application information 300 that may be utilized in a credit application risk determination process. According to an exemplary embodiment, classifications of information associated with an identity 302 can include, but are not limited to, history classification 304, sources classification 306, associates classification 308, verification classification 312, velocity classification 314, and/or variation classification 316.

In an exemplary embodiment, the history classification 304 may include applicant information duration of time since the last date update, number of records on file, and/or the number of sources for a particular file item. According to exemplary embodiments, such information may be utilized separately or in various combinations to provide confidence values or weightings for determining the reliability of the information. For example, an applicant having only a few recent records on file may be considered to have a high identity fraud risk relative to an applicant having a full history of records from a number of sources.

In an exemplary embodiment, the source classification 304 may utilize the type of source confirming the identity. For example, sources can include a credit bureau, government information, public records, or other available information sources. According to exemplary embodiments, the source information may be utilized separately or in various combinations for scoring identity fraud risk and/or determining the reliability of information. For example, some sources may be considered to be more reliable than others, and the information obtained from the various sources may be weighted accordingly.

In an exemplary embodiment, the associates classification 308 may be utilized to determine colleagues, peers, relatives, etc., that may be associated with the applicant. For example, data relating to the associates classification 308 may include the number of associates or relatives that are tied, connected, or otherwise associated with the applicant. In some embodiments, the associates classification 308 data can be utilized to determine if there are associates or relatives of the applicant with suspicious activity or high fraud rates.

In an exemplary embodiment, data related to the verification classification 312 may be utilized for verifying the applicant's identity. For example, verification of the applicant's identity can be scored based in part on the number of sources that confirm the identity of the application. Additionally, and according to certain exemplary embodiments, the types of sources that confirm the applicant's identity may provide a further measure of the validity of the applicant's identity. For example, some data source accessed may be considered to have reliable and up-to date information associated with an applicant, while other sources may have somewhat less reliable information. Government issued motor vehicle registration, for example, may be associated with previous credit applications. According to exemplary embodiments, confirming sources may provide information confirming the applicant's address, social security number, name, date of birth, etc. The type and number of confirming sources may, separately or in combination, provide additional indicators of reliability of the information.

In an exemplary embodiment, data related to the velocity classification 314 may be utilized with the other classification and information, for determining applicant's identity. For example, the velocity classification 314 relates to the number of searches performed for a given applicant over a given period. In certain situations, the velocity of credit checks, database access, identification searches, third party searches, number or searches per application, etc., may provide additional indications of identity fraud risk.

In accordance with exemplary embodiments, another classification that may be utilized to detect identity fraud risk is a variation classification 316. This classification may be utilized to track and/or tabulate changes and/or frequency of changes in applicant data, including changes related to personal information such as social security numbers, names, address, etc. According to an exemplary embodiment, the frequency of changes (or number of changes over a given period) with respect to any of the applicant data may also be determined for use with the velocity classification 314. For example, applicants who provide different personal information from application to application may pose a higher risk for identity fraud compared with someone who submits very little change in their personal information from application to application.

In accordance with exemplary embodiments, the applicant-supplied personal information may be analyzed to determine if such information corresponds to conditions that indicate high identity fraud risk. For example, a social security number (SSN) can be checked to determine if it is valid or not. An invalid SSN, a SSN supplied by the applicant that corresponds to a person who has been reported as deceased, an SSN issued prior to the applicant's date-of-birth; and/or a SSN used by multiple different identities would all be indicators of high identity fraud risk. Another indicator of high identity fraud risk includes multiple suspicious identities at the applicant's address.

According to exemplary embodiments, the applicant's residential address history may be taken into account for determining identity fraud risk. For example, the length of residence at one or more addresses, the number of address moves, and/or the number of utility connects and disconnects may be indicators of identity fraud.

Figure 4:
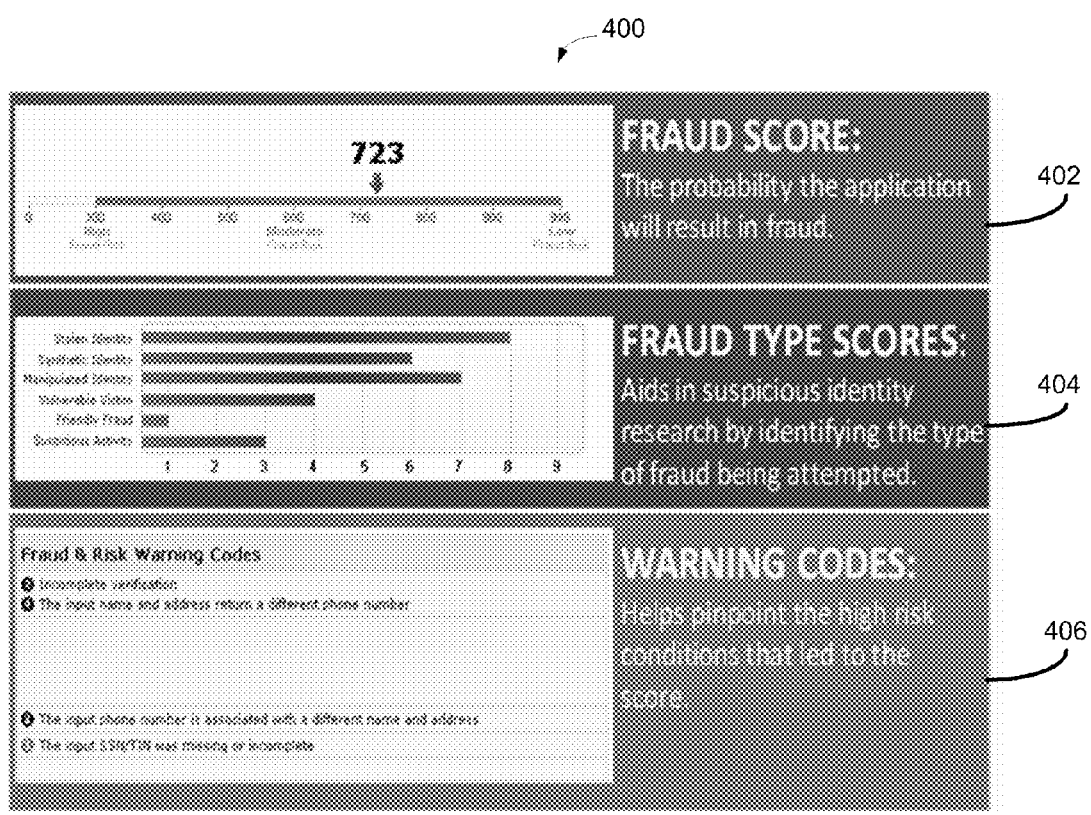
FIG. 4 is an illustrative risk score and risk type output 400 according to an exemplary embodiment of the invention.

FIG. 4 depicts an illustrative risk score and risk type output 400 according to an exemplary embodiment of the invention. For example, the output may include a numerical and/or graphical representation of a fraud risk score 402. In an exemplary embodiment, the fraud risk score 402 may represent a probability that the application will result in fraud. As shown in FIG. 4, and according to one embodiment, a fraud risk score 402 may be represented on a scale from 300 (high fraud risk) to a score of 999 (low fraud risk). In other exemplary embodiments, the scale representing low to high fraud risk scores may be shifted, reversed, or scaled according to any convenient lower and upper numerical limit.

According to an exemplary embodiment, and as depicted in FIG. 4, the output 400 may include a representation of the breakdown of fraud type scores 404. Such information may be useful for identifying the type of fraud attempts, and it may provide an aid for further research when suspicious identity activity is detected. For example, the credit application risk scoring system may provide a breakdown of fraud type scores 404 in which available risk factors have been considered and processed to determine that there is a high likelihood of a stolen identity. In such a case, additional identity information may be automatically required from the applicant to further process the credit application. For example, a birth certificate, social security card, drivers license, etc, may be required to further process the application. In other exemplar embodiments, a combination of the fraud risk score 402 and the fraud type scores 404 may be utilized to determine if additional identity proof is required.

FIG. 4 also depicts an output 400 that provides warning codes 406 to help illuminate any of the high risk conditions uses in computing the fraud score 402. For example, the warning codes 406 may provide information that there was an incomplete verification of the applicant's information. In another example, the warning codes 406 may provide information that a phone number associated with the applicant's name is different than the phone number associated with the applicant's address. In another example embodiment, the warning codes 406 may indicate that the input phone number is associated with a name different than the one provided by the applicant. Other examples of warning codes 406 can include information such as a social security number that is missing or incomplete. In accordance with exemplary embodiments of the invention, numerous other warning codes may be provided in the output 400. For example, Table 1 above indicates some of the issues that can affect the fraud score 402 and that may be displayed as warning codes 406.

Figure 5:
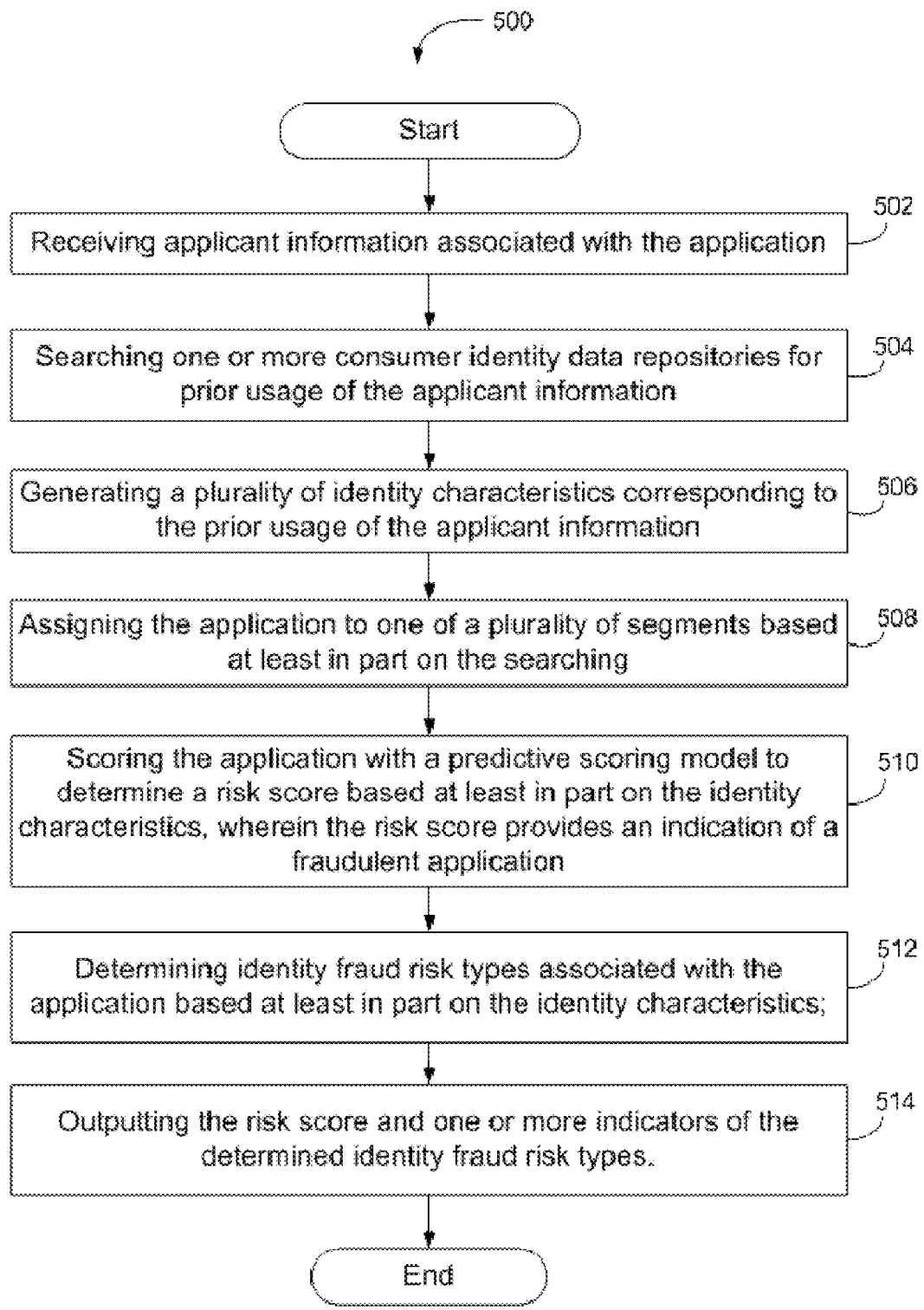
FIG. 5 is a flow diagram 500 of a method according to an exemplary embodiment of the invention.

An example method 500 for determining fraud risk associated with a credit application will now be described with reference to the flowchart of FIG. 5. The method 500 starts in block 502, and according to an example embodiment of the invention includes receiving applicant information associated with the application. In block 504, the method 500 includes searching one or more consumer identity data repositories for prior usage of the applicant information. In block 506, the method 500 includes generating a plurality of identity characteristics corresponding to the prior usage of the applicant information. In block 508, the method 500 includes assigning the application to one of a plurality of segments based at least in part on the searching. In block 510, the method 500 includes scoring the application with a predictive scoring model to determine a risk score based at least in part on the identity characteristics, wherein the risk score provides an indication of a fraudulent application. In block 512, the method 500 includes determining identity fraud risk types associated with the application based at least in part on the identity characteristics. In block 514, the method 500 includes outputting the risk score and one or more indicators of the determined identity fraud risk types. The method 500 ends after block 514.

In accordance with exemplary embodiments, determining the identity fraud risk types include evaluating the application for one or more of a synthetic identity, a stolen identity, a manipulated identity, a vulnerable victim, a friend or family fraud, or a high risk identity with a record of suspicious activity. In accordance with exemplary embodiments, scoring the application with the predictive scoring model includes utilizing a predictive scoring model that uniquely corresponds to the one of a plurality of segments for which the application is assigned. In accordance with exemplary embodiments, assigning the application to one of a plurality of segments is further based on at least one of: a social security number (SSN) that has either been reported as deceased; a SSN that was issued prior to the declared date-of-birth on the application; applicant identity information that matches at least part of corresponding search results information, but an associated address presented that has not previously been reported as a residential address for the applicant; applicant identity information not previously reported by any available identity source; applicant identity information that has only been reported by credit bureau sources; applicant identity information that matches information reported by derogatory or law enforcement sources; applicant identity information having elevated recent account opening activity; or applicant identity information that does not correspond to any of the other segments.

In accordance with exemplary embodiments, scoring the application differentiates normal, low risk, and high fraud risk applications. In accordance with exemplary embodiments, receiving applicant information associated with the application includes receiving one or more of a name, a phone number, a social security number, a date of birth, or an address. In accordance with exemplary embodiments, generating the plurality of identity characteristics includes evaluating applicant information for one or more of social security number validation, address validation, characteristics of the address, issuance characteristics of the social security number, correlation of the individual identity elements in the consumer identity data repositories, velocity of the appearance of the identity in account opening searches, divergence between identity elements in account opening searches, history of the identity in the consumer identity data repositories, sources reporting the identity, associates and relatives of the identity, variation of the identity elements reported, or verification of the application identity as an existing identity known from consumer identity data repositories.

According to exemplary embodiments of the invention, a systems and computer readable media are also provided that may enable the example functions, processes, steps, etc., as enumerated above.

According to example embodiments, certain technical effects can be provided, such as creating certain systems and methods that provide. Example embodiments of the invention can provide the further technical effects of providing systems and methods for detecting identity fraud, and providing rich information regarding the type of identity fraud.

In example embodiments of the invention, the credit application risk scoring system 100 may include any number of hardware and/or software applications that are executed to facilitate any of the operations. In example embodiments, one or more I/O interfaces may facilitate communication between the credit application risk scoring system 100 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the credit application risk scoring system 100. The one or more I/O interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the credit application risk scoring system 100 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ (owned by Telefonaktiebolaget LM Ericsson) enabled network, a Wi-Fi™ (owned by Wi-Fi Alliance) enabled network, a satellite-based network any wired network, any wireless network, etc., for communication with external devices and/or systems.

As desired, embodiments of the invention may include the credit application risk scoring system 100 with more or less of the components illustrated in FIG. 1.

Certain embodiments of the invention are described above with reference to block and flow diagrams of systems and methods and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method comprising executing computer executable instructions by one or more processors for determining fraud risk associated with a credit application, the method further comprising:

receiving applicant information associated with the application;

searching, by one or more computer processors, one or more consumer identity data repositories for prior usage of the applicant information;

generating, by the one or more computer processors, a plurality of identity characteristics corresponding to the prior usage of the applicant information;

assigning the application to one of a plurality of segments based at least in part on the searching, wherein assigning the application to at least one of the plurality of segments is based at least in part on applicant identity information that has only been reported by credit bureau sources;

scoring, by the one or more computer processors, the application with a predictive scoring model that uniquely corresponds to one or more of the plurality of segments for which the application is assigned to determine a risk score based at least in part on the identity characteristics, wherein the risk score provides an indication of a fraudulent application;

determining, by the one or more computer processors, identity fraud risk types associated with the application based at least in part on the identity characteristics; and outputting, by the one or more computer processors, the risk score and one or more indicators of the determined identity fraud risk types.

2. The method of claim 1, wherein determining the identity fraud risk types comprises evaluating the application for one or more of the following: a synthetic identity, a stolen identity, a manipulated identity, a vulnerable victim, a friend or family fraud, or a high risk identity with a record of suspicious activity.

3. The method of claim 1, wherein scoring the application with the predictive scoring model comprises utilizing a predictive scoring model that uniquely corresponds to the one of a plurality of segments for which the application is assigned.

4. The method of claim 1, wherein the assigning the application to one of a plurality of segments is further based on at least one of:
- a social security number (SSN) that has been reported as associated with a deceased person;
- a SSN that was issued prior to the declared date-of-birth on the application;
- applicant identity information that matches at least part of corresponding search results information, but an associated address presented that has not previously been reported as a residential address for the applicant;
- applicant identity information not previously reported by any available identity source;
- applicant identity information that matches information reported by derogatory or law enforcement sources;
- applicant identity information having elevated recent account opening activity; or
- applicant identity information that does not correspond to any of the other segments.

5. The method of claim 1, wherein scoring the application differentiates normal, low risk, and high fraud risk applications.

6. The method of claim 1, wherein receiving applicant information associated with the application comprises receiving one or more of the following: a name, a phone number, a social security number, a date of birth, or an address.

7. The method of claim 1, wherein generating the plurality of identity characteristics comprises evaluating applicant information for one or more of the following: social security number validation, address validation, characteristics of the address, issuance characteristics of the social security number, correlation of the individual identity elements in the consumer identity data repositories, velocity of the appearance of the identity in account opening searches, divergence between identity elements in account opening searches, history of the identity in the consumer identity data repositories, sources reporting the identity, associates and relatives of the identity, variation of the identity elements reported, or verification of the application identity as an existing identity known from consumer identity data repositories.

8. A system comprising:
At least one processor;
at least one memory for storing data and computer-executable instructions, wherein the processor is configured to access the at least one memory and further configured to execute the computer-executable instructions to:
receive applicant identity information associated with a credit application;
search one or more consumer identity data repositories for prior usage of the applicant information;
generate a plurality of identity characteristics corresponding to the prior usage of the applicant information;
assign the application to one of a plurality of segments based at least in part on the search, wherein assigning the application to at least one of the plurality of segments is based at least in part on applicant identity information that has only been reported by credit bureau sources;
score the application with a predictive scoring model that uniquely corresponds to one or more of the plurality of segments for which the application is assigned to determine a risk score based at least in part on the identity characteristics, wherein the risk score provides an indication of a fraudulent application;
determine identity fraud risk types associated with the application based at least in part on the identity characteristics; and
output the risk score and one or more indicators of the determined identity fraud risk types.

9. The system of claim 8, wherein the identity fraud risk types comprise one or more of the following: a synthetic identity, a stolen identity, a manipulated identity, a vulnerable victim, a friend or family fraud, or a high risk identity with a record of suspicious activity.

10. The system of claim 8, wherein the predictive scoring model uniquely corresponds to the one of a plurality of segments for which the application is assigned.

11. The system of claim 8, wherein the application is assigned to the one of a plurality of segments based on at least in part on one of:
- a social security number (SSN) that has been reported as associated with a deceased person;
- a SSN that was issued prior to the declared date-of-birth on the application;
- applicant identity information that matches at least part of corresponding search results information, but an associated address presented that has not previously been reported as a residential address for the applicant;
- applicant identity information not previously reported by any available identity source;
- applicant identity information that matches information reported by derogatory or law enforcement sources;
- applicant identity information having elevated recent account opening activity; or
- applicant identity information that does not correspond to any of the other segments.

12. The system of claim 8, wherein the application is scored to differentiate normal, low risk, and high fraud risk applications.

13. The system of claim 8, wherein the applicant information comprises one or more of the following: a name, a phone number, a social security number, a date of birth, or an address.

14. The system of claim 8, wherein the plurality of identity characteristics are generated based on one or more of the following: social security number validation, address validation, characteristics of the address, issuance characteristics of the social security number, correlation of the individual identity elements in the consumer identity data repositories, velocity of the appearance of the identity in account opening searches, divergence between identity elements in account opening searches, history of the identity in the consumer identity data repositories, sources reporting the identity, associates and relatives of the identity, variation of the identity elements reported, or verification of the application identity as an existing identity known from consumer identity data repositories.

15. One or more non-transitory computer readable media comprising computer-executable instructions that, when executed by one or more processors, configure the one or more processors to:

receive applicant information associated with a credit application;

search one or consumer identity data repositories for prior usage of the applicant information;

generate a plurality of identity characteristics corresponding to the prior usage of the applicant information;

assign the application to one of a plurality of segments based at least in part on the search, wherein assigning the application to at least one of the plurality of segments is based at least in part on applicant identity information that has only been reported by credit bureau sources;

score the application with a predictive scoring model that uniquely corresponds to one or more of the plurality of segments for which the application is assigned to determine a risk score based at least in part on the identity characteristics, wherein the risk score provides an indication of a fraudulent application;

determine identity fraud risk types associated with the application based at least in part on the identity characteristics; and output the risk score and one or more indicators of the determined identity fraud risk types.

16. The computer readable media of claim 15, wherein the identity fraud risk types comprise one or more of the following: a synthetic identity, a stolen identity, a manipulated identity, a vulnerable victim, a friend or family fraud, or a high risk identity with a record of suspicious activity.

17. The computer readable media of claim 15, wherein the predictive scoring model uniquely corresponds to the one of a plurality of segments for which the application is assigned.

18. The computer readable media of claim 15, wherein the application is assigned to the one of a plurality of segments based on at least in part on one of:

a social security number (SSN) that has been reported as associated with a deceased person;

a SSN that was issued prior to the declared date-of-birth on the application;

applicant identity information that matches at least part of corresponding search results information, but an associated address presented that has not previously been reported as a residential address for the applicant;

applicant identity information not previously reported by any available identity source;

applicant identity information that matches information reported by derogatory or law enforcement sources;

applicant identity information having elevated recent account opening activity; or applicant identity information that does not correspond to any of the other segments.

19. The computer readable media of claim 15, wherein the application is scored to differentiate normal, low risk, and high fraud risk applications.

20. The computer readable media of claim 15, wherein the plurality of identity characteristics are generated based on one or more of the following: social security number validation, address validation, characteristics of the address, issuance characteristics of the social security number, correlation of the individual identity elements in the consumer identity data repositories, velocity of the appearance of the identity in account opening searches, divergence between identity elements in account opening searches, history of the identity in the consumer identity data repositories, sources reporting the identity, associates and relatives of the identity, variation of the identity elements reported, or verification of the application identity as an existing identity known from consumer identity data repositories.

* * * * *